United States Patent

[11] 3,586,004

| [72] | Inventors | Richard A. De Pauw<br>East Moline, Ill.;<br>William H. Knapp, Davenport, Iowa |
|---|---|---|
| [21] | Appl. No. | 864,848 |
| [22] | Filed | Oct. 8, 1969 |
| [45] | Patented | June 22, 1971 |
| [73] | Assignee | International Harvester Company<br>Chicago, Ill. |

[54] ROTOR KNIFE ATTACHMENT
6 Claims, 2 Drawing Figs.

[52] U.S. Cl. .................................................. 130/27 T
[51] Int. Cl. ..................................................... A01f 12/20
[50] Field of Search ............................................ 130/27.17,
27.15, 27 R; 56/16, 60, 500; 146/107

[56] References Cited
UNITED STATES PATENTS

| 2,385,451 | 9/1945 | Krause et al. .................. | 146/107 L |
| 2,731,995 | 1/1956 | Sutherland et al. ............ | 146/107 L |

*Primary Examiner*—Antonio F. Guida
*Attorney*—Noel G. Artman

ABSTRACT: A threshing machine having an elongated threshing cylinder through which crops are axially fed. A rotor mounted within the threshing cylinder having impeller blades at the grain entry end. The impeller blades have a flat planar portion, a scoop portion including a sweptback leading edge, and detachable rotary knife members. The rotary knife members can work by themself or in conjunction with the stationary knife carried by the threshing cylinder.

INVENTORS
RICHARD A. DE PAUW
WILLIAM H. KNAPP

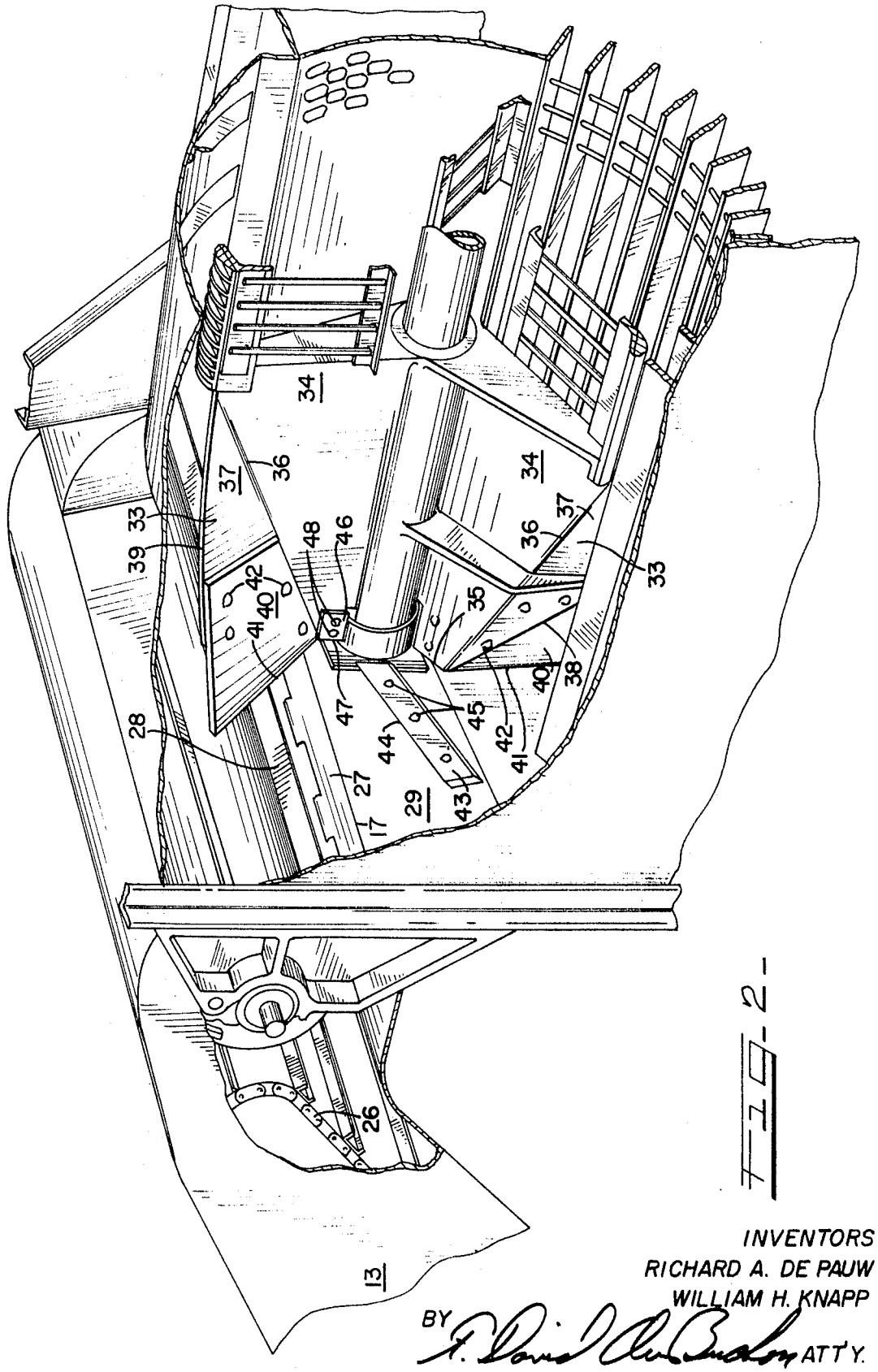

ROTOR KNIFE ATTACHMENT

BACKGROUND OF THE INVENTION

1. Field of the Invention

The present invention relates generally to improvements in combines and the like and more particularly to a new and improved grain entry arrangement for an axial flow combine wherein the impeller blades include rotary knives that can operate alone or in combination with a stationary knife.

2. Description of the Prior Art

In most commercially available combines the material to be threshed is fed between a rotary cylinder and a stationary concave in a direction normal to the axis of the rotating cylinder. Most of the grain from the material fed to the cylinder and concave pass through the concave as threshed grain. The remainder of the material is conveyed to the separating components of the combine which in conventional machines includes reciprocating or oscillating straw racks and chaffer sieves.

This invention concerns a combine that operates on a completely different principle than the above-described commercially available combine. In the combine described in the subject patent, an elongated rotor is provided along the longitudinal axis of the combine. The elongated rotor is enclosed within a cylinder having transport fins along its internal upper surface and a concave and grate along its lower surface. The material to be threshed is fed into the front end of the cylinder and is fed axially towards the rear as it is being processed by the cooperating elements of the rotor and cylinder. In axial flow combines of this type, the rotor revolves at a high rate of speed and there is a rather small clearance between the rotor and the cylinder thus making it difficult to introduce material into the cylinder. The contour of the throat or entrance area of the threshing cylinder and also the shape of the impeller carried by the rotor are critical features of this type machine and determine its ability to accept material into the cylinder. Reference may be made to the U.S. Pat. No. 3,464,419 to Knapp et al. issued on Sept. 2, 1969 and filed Oct. 31, 1966 (D-8690 for a complete disclosure of the throat or entrance area of the threshing cylinder. Reference may be made to the application of Van Buskirk Ser. No. 741,963 filed on July 2, 1968 for a disclosure of impeller blades carried by the front end of the rotor. It should be noted that in the above referred to Van Buskirk application, the leading edge of the impeller blades are blunt and are swept back as are the impeller blades disclosed in the subject application. In accordance with these disclosures, each impeller blade encounters a ribbon of incoming material, separates a bundle from the ribbon and initiates the movement of this material through the threshing and separating cylinder. However, long, tough material is more adhesive and does not readily break down into bundles and this condition creates a feeding problem into the forward end of the threshing and separating cylinder.

SUMMARY

The general purpose of this invention is to provide an axial flow combine which embraces all the advantages of similarly employed axial flow combines and has an improved and more versatile ability to receive material into the threshing cylinder. One of the requirements of the commercially feasible combine is that it must perform acceptably in numerous crops and crop conditions. The subject invention has significantly enhanced the versatility of this machine. To obtain this, the present invention contemplates a unique arrangement whereby, bolt-on rotary knife members and a cooperating stationary blade can be secured to the impeller blades and threshing cylinder respectively, thus providing means for cutting long, tough material into lengths as it is fed into the machine. This arrangement permits the use of an impeller having a blunt leading edge when it is not necessary to cut the incoming material into lengths and to attach knife blades when necessary. The length of the cut material is dependent on the rotary speed and the number of working knives, thus an optimum length can be obtained by adding or removing knives from the impeller.

An object of this invention is to alleviate a feeding problem in axial flow combines that is encountered when long, tough material must be fed into the threshing and separating cylinder and to render the machine more versatile and adaptable to various crop conditions.

BRIEF DESCRIPTION OF THE DRAWINGS

FIG. 2 is a pictorial view of the front end of the threshing cylinder and the platform feeder having portions broken away to show the material processing mechanism.

DESCRIPTION OF THE PREFERRED EMBODIMENT

Figure 1:
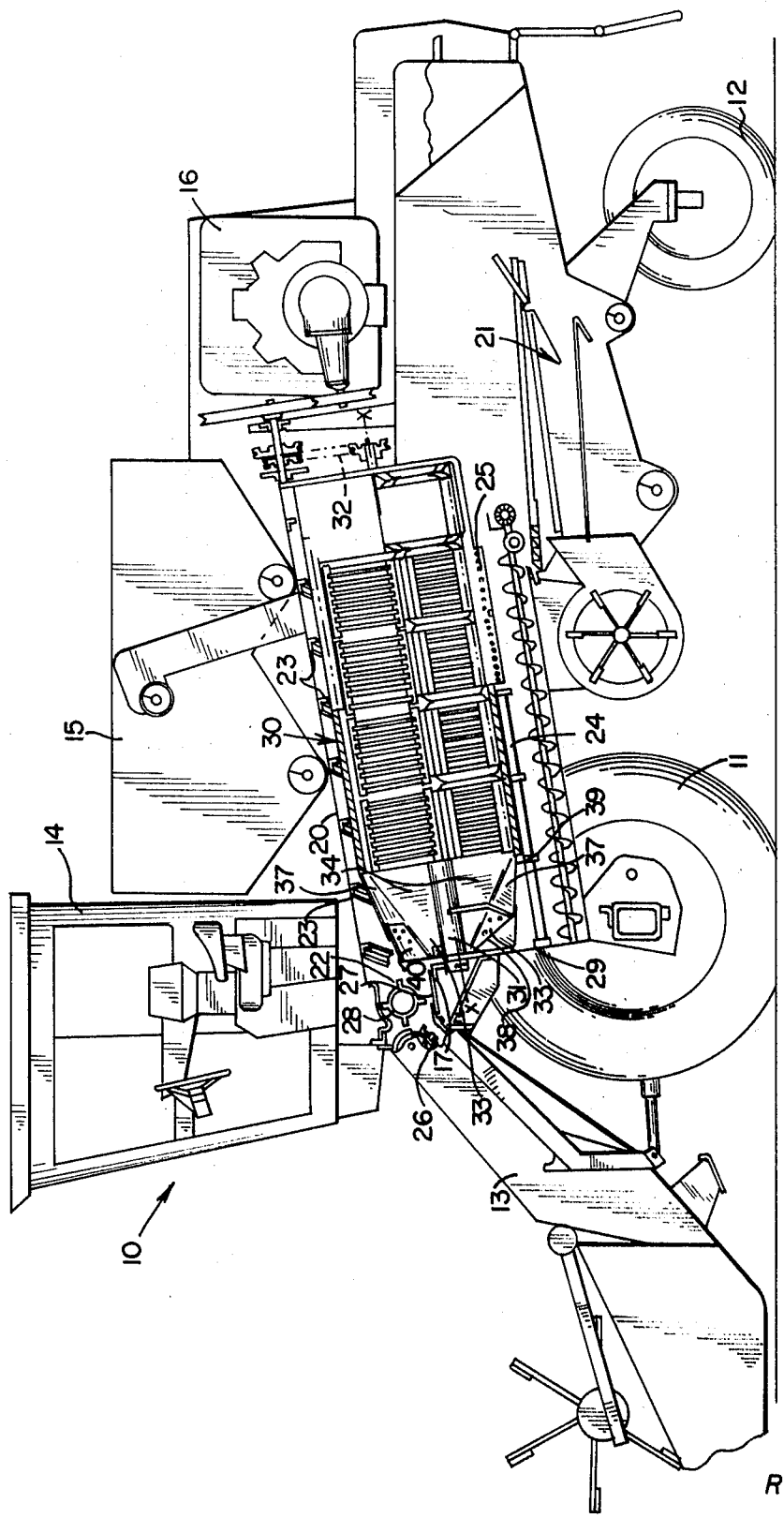
FIG. 1 is a side view of a combine having portions broken away to show the threshing, separating and cleaning components.

Referring now to the drawings wherein like reference characters designate like or corresponding parts throughout the several views, there is shown in FIG. 1 a self-propelled combine designated 10 having drive wheels 11 [only one shown] and rear steerable wheels 12 [only one shown]. The combine 10 includes a header 13, an operator's cab 14, a grain tank 15, and an engine 16. The processing portion of the combine 10 includes a tubular casing 20 having a fore and aft axis identified in FIG. 1 as X-X. The forward end 22 of the tubular casing 20 is partially closed by an end wall 29 having an upper horizontal edge 17. The upper horizontal edge 17 is located above axis X-X and forms a juncture with a generally horizontal feed plate 27. Unthreshed material is fed into the tubular casing 20 through its forward end 22 and the threshing and separating functions occur within the tubular casing. There are a plurality of transport fins 23 protruding from the upper internal surface of the tubular casing that function to index the material from the forward end 22 rearwardly through the tubular casing. The bottom portion of the tubular casing 20 is made up of a concave 24 and a grate 25 through which the threshed grain passes and is then fed to the cleaning system 21. An elongated rotor 30 having a central hub 31 is mounted within the tubular casing 20 about fore and aft axis X-X. Drive means 32 connect the elongated rotor 30 to the engine 16. A plurality of impeller blades 33 are secured to the forward end of the hub 31.

The header 13 collects the unthreshed crops and conveys it rearwardly and upwardly towards the forward end 22 of the tubular casing 20. The header 13 includes an undershot conveyor 26 that can be seen in FIGS. 1 and 2. Unthreshed material is fed by the undershot conveyor 26 rearwardly towards a beater 28. The generally horizontal feed plate 27 is below the beater 28 and these elements cooperate to feed a layer of unthreshed material into the forward end 22 of the tubular casing 20. It should be noted that the generally horizontal feed plate 27 is located a considerable distance above the fore and aft axis X-X of the tubular casing. For a more detailed disclosure of the general operation of an axial flow combine of this type, reference should be made to the above referred to Van Buskirk application Ser. No. 741,963 filed on July 2, 1968.

The elongated rotor 30 disclosed herein has three impeller blades 33 secured to the hub and extending outwardly therefrom. Each impeller blade 33 includes a flat planar portion 34 that extends axially along the hub of the elongated rotor. Each flat planar portion 34 has a radially extending leading edge 35 and an outer edge 36 that diverges rearwardly with respect to the axis X-X. Each of the impeller blades 33 also includes a scoop portion 37 which extends from the outer edge 36 into the direction of rotation (see arrow in FIG. 2) of the rotor 30. The scoop portion 37 is made up of a generally triangular sheet of material, one edge of which corresponds to the outer edge 36 of the flat planar portion, a second edge forms a sweptback leading edge 38 and the third edge is identified as the outer edge 39. It should be noted that the impeller blade could be fabricated from several pieces of material or cast as an integral unit. First rotary knife members 40 having sharp leading edges 41 are detachably connected to the scoop portions 37 by means such as nuts and bolts 42. When first knife members 40 are mounted on the impeller, the sharp leading edges 41 lay in a plane substantially normal to the fore and aft axis X-X and are forward of the sweptback edges 38. Second rotary knife members 46 having cutting edges 47 are detachably secured to the impeller blades 33 along the radially extending edges 35 by means 48 such as nuts and bolts. Second rotary knife members 46 are mounted such that the cutting edges 47 lay in a plane substantially normal to the fore and aft axis X-X and are forward of the radially extending leading edges 35. A stationary blade 43 having a cutting edge 44 is detachably secured by means 45 to the end wall 29 of the tubular casing 20. Stationary blade 43 is secured adjacent the upper horizontal edge 17 such that cutting edge 44 extends substantially radially with respect to the fore and aft axis X-X and is located such that there is a cooperative shearing relationship between stationary cutting edge 44 and the rotating edges 41 and 47. It should also be noted that stationary blade 43 is located such that the shearing action occurs as the impeller blades 33 are moving downwardly.

The rotating knives 40 and 46 can be used alone or in combination with the stationary blade 43 in which case a scissor-slike shearing action occurs. One or more sets of rotating knives 40 and 46 can be used depending upon the length of cut material desired.

It should be understood, of course, that the foregoing disclosure relates to only a preferred embodiment of the invention and that numerous modifications or alterations could be made therein.

What we claim is:

1. In an axial flow combine having a tubular casing formed about a fore and aft axis, and end wall partially closing the forward end of said tubular casing, said end wall having an upper horizontal edge located above said fore and aft axis, a generally horizontal feed plate extending forwardly from said upper horizontal edge, a rotary beater mounted over said horizontal feed plate and functioning to feed material into the forward end of said tubular casing, an elongated rotor having a hub journaled for rotation about said fore and aft axis within said tubular casing, impeller blades secured to the forward end of said hub, means for driving said rotor in a given direction, each impeller blade including:

a flat planar portion extending axially of said elongated rotor, said flat planar portion having a radially extending leading edge terminating at a point below said horizontal feed plate and an outer edge diverging rearwardly with respect to said axis, a scoop portion joined to said flat planar portion along said outer edge and protruding into said given direction, said scoop portion including a sweptback edge that intersects with said radially extending leading edge, a first rotary knife member having a sharp leading edge, and means for detachably connecting said first rotary knife member to a scoop portion such that said sharp leading edge is forward of said sweptback edge.

2. The invention as set forth in claim 1 wherein said sharp leading edge lies in a plane normal to said fore and aft axis.

3. The invention as set forth in claim 2 wherein a stationary blade is secured to said end wall adjacent said upper horizontal edge, said stationary blade having a cutting edge lying in a plane normal to said fore and aft axis in cooperative shearing relationship with said first rotary knife member to thus cut the incoming material into lengths.

4. The invention as set forth in claim 1 wherein a second rotary knife member is secured to said impeller blade along said radially extending leading edge.

5. The invention as set forth in claim 4 wherein said sharp leading edge lies in a plane normal to said fore and aft axis.

6. The invention as set forth in claim 5 wherein a stationary blade is secured to said end wall adjacent said upper horizontal edge, said stationary blade having a cutting edge lying in a plane normal to said fore and aft axis in cooperative relationship to said first and second rotary knife members to thus cut the incoming material into lengths.